(12) United States Patent
Ito (10) Patent No.: US 8,070,301 B2
(45) Date of Patent: Dec. 6, 2011

(54) MULTI-LAMP PROJECTION DISPLAY APPARATUS WITH LAMP MANAGEMENT

(75) Inventor: Yoshinori Ito, Shizuoka (JP)

(73) Assignee: Sony Corporation, Tokyo (JP)

( * ) Notice: Subject to any disclaimer, the term of this patent is extended or adjusted under 35 U.S.C. 154(b) by 348 days.

(21) Appl. No.: 12/267,835

(22) Filed: Nov. 10, 2008

(65) Prior Publication Data

US 2009/0122276 A1 May 14, 2009

(30) Foreign Application Priority Data

Nov. 13, 2007 (JP) ................................. 2007-294888

(51) Int. Cl.
*G03B 21/20* (2006.01)
*F21V 23/04* (2006.01)

(52) U.S. Cl. ......................................... 353/87; 362/276

(58) Field of Classification Search .............. 353/85–87; 315/312; 362/276

See application file for complete search history.

(56) References Cited

U.S. PATENT DOCUMENTS

| 6,336,724 B1 * | 1/2002 | Shouji et al. .................... 353/20 |
| 6,802,615 B2 * | 10/2004 | Okada ............................. 353/85 |
| 2007/0075647 A1 * | 4/2007 | Tsintzouras et al. .......... 315/119 |
| 2008/0288119 A1 * | 11/2008 | Fenkart et al. ................ 700/286 |

FOREIGN PATENT DOCUMENTS

| JP | 08-220637 | 8/1996 |
| WO | WO 2007062716 A1 * | 6/2007 |

* cited by examiner

*Primary Examiner* — Thanh X Luu (74) *Attorney, Agent, or Firm* — Wolf, Greenfield & Sacks, P.C.

(57) ABSTRACT

A multi-lamp projection display apparatus is provided. The multi-lamp projection display apparatus includes a plurality of detachable lamp boxes each having a lamp used as a light source and a memory; and a control device configured to assign an address of the memory in each of the lamp boxes in accordance with an attaching position of the lamp box and write information into the memory.

11 Claims, 5 Drawing Sheets

FIG. 6

MULTI-LAMP PROJECTION DISPLAY APPARATUS WITH LAMP MANAGEMENT

CROSS REFERENCES TO RELATED APPLICATIONS

The present invention contains subject matter related to Japanese Patent Application JP 2007-294888 filed in the Japanese Patent Office on Nov. 13, 2007, the entire contents of which being incorporated herein by reference.

BACKGROUND OF THE INVENTION

1. Field of the Invention

The present invention relates to a multi-lamp projection display apparatus using a plurality of lamps as a light source, particularly a multi-lamp projection display apparatus capable of managing the operating times and the like of the respective lamps without an error even if the lamps are replaced with new ones or interchanged with each other.

2. Description of the Related Art

Heretofore, projectors (projection display apparatuses) using a lamp as light sources have been designed to have a control circuit therein. For displaying a warning message before the lamp reaches the end of product's life, or the like, such control circuit stores the operating time of the lamp (period from light-on to light-off) cumulatively in a nonvolatile memory installed in the projector. The user may reset the cumulative time when replacing the lamp with a new one. Such a user's operation allows the control circuit to reset the operating-time information stored in the nonvolatile memory to zero.

However, the reset operation, which is carried out by the user every time he or she replaces the lamp, is complicated. In addition, when the reset operation is not carried out even at the time of replacement, the operating time of the lamp after the replacement is added to the last operating time of the lamp before the replacement. On the other hand, when the reset operation is carried out accidentally at the time of any event other than the replacement, the present information about the operating time of the lamp is wiped out.

Furthermore, in order to increase luminance, multi-lamp projectors with two or more lamps as their light sources have been developed in recent years. Any of such projectors may have a need for replacing only one of the lamps with a new one. Thus, when the reset operation is carried out on such a projector just as in the case with the aforementioned projectors, the user should remember which lamp is replaced and then reset the operating time of the lamp. In the multi-lamp projector, therefore, the reset operation is more complicated and leads to an increase in possibility of wrong operation (e.g., a reset operation is accidentally carried out on the operating time of any of the remaining lamps without replacement).

Japanese Unexamined Patent Application Publication No. H08-220637 proposes a projector with a holding mechanism for holding a lamp in a replaceable manner. Such a holding mechanism has a nonvolatile memory held with the lamp. The control circuit in the projector stores information about the operating time of the lamp or the like in the memory. According to a technology described in Japanese Unexamined Patent Application Publication No. H08-220637, the lamp can be replaced with a new one with the replacement of its accompanying nonvolatile memory in which the information about the operating time of the lamp is stored. Therefore, the reset operation at the time of the lamp replacement can be omitted.

SUMMARY OF THE INVENTION

However, Japanese Unexamined Patent Application Publication No. H08-220637 as described above discloses only a projector having one lamp as a light source. In contrast, any multi-lamp projector may require an interchange of lamps being currently attached to respective attaching positions, other than the replacement thereof. For example, in the case of a two-lamp projector on which a lamp can be attached to each of the left and right sides of the body thereof, the two lamps attached at the respective attaching positions can be interchanged with each other.

Therefore, the multi-lamp projector may require the management of the operating time or the like of each lamp without an error even if such an interchange of the lamps is carried out.

It is desirable to provide a multi-lamp projection display apparatus capable of managing the operating time or the like of each lamp without an error not only when any lamp is replaced with a new one but also when a plurality of lamps at respective attaching positions are interchanged with each other.

According to an embodiment of the present invention, there is provided a multi-lamp projection display apparatus including: a plurality of detachable lamp boxes and a control device. Each of the lamp boxes includes a lamp used as a light source and a memory. The control device is configured to assign an address of the memory mounted on each of the lamp boxes in accordance with an attaching position of the lamp box and write information into the memory.

Here, a plurality of lamp boxes each having a lamp and memory are attached to the multi-lamp projection display apparatus so that a plurality of lamps are used as a light source. The address of the memory in each lamp box is assigned with respect to the attaching position of the lamp box.

In other words, the addresses of the respective memories are not fixed. These addresses are interchanged when the lamp boxes attached to the respective positions are interchanged with each other. Thus, when focusing attention on an individual attaching position, any memory in the lamp box attached to that position has a fixed address. The addresses determined in this way are then specified to write information into the respective memories.

Here, if memories have their respective fixed addresses, after interchanging lamp boxes at attaching positions, an address of an attached memory is different from that of the previous memory having been attached to the same position. Therefore, when the user intends to write information about the operating time of a lamp into the memory in the lamp box including the lamp, it is difficult to access the memory and write information therein without an error. In other words, when the user intends to write information about the operating time of the lamp into a memory in a lamp box at one attaching position, the information may be written into a memory in a lamp box at another attaching position. This is because the previously attached lamp box including the memory with the address of interest is currently located at another attaching position due to the interchange.

According to the embodiment of the present invention, on the other hand, an address of a memory is fixed in accordance with an attaching position. Thus, when the operating time or the like of a lamp is written into the memory, the fixed address corresponding to the attaching position of the lamp is designated. In this case, regardless of whether lamp boxes have been interchanged, the memory in the lamp box including the lamp can be accessed and the information can be then written in such a memory without an error.

Consequently, the operating times or the like of the respective lamps can be managed without an error even if any lamp is replaced with a new one or lamps are interchanged with each other.

According to an embodiment of the present invention, a multi-lamp projection display apparatus using a plurality of lamps as a light source can manage the operating times of the respective lamps without an error even if any lamp is replaced with a new one or lamps at respective attaching positions are interchanged with each other.

DESCRIPTION OF THE PREFERRED EMBODIMENTS

Figure 1:
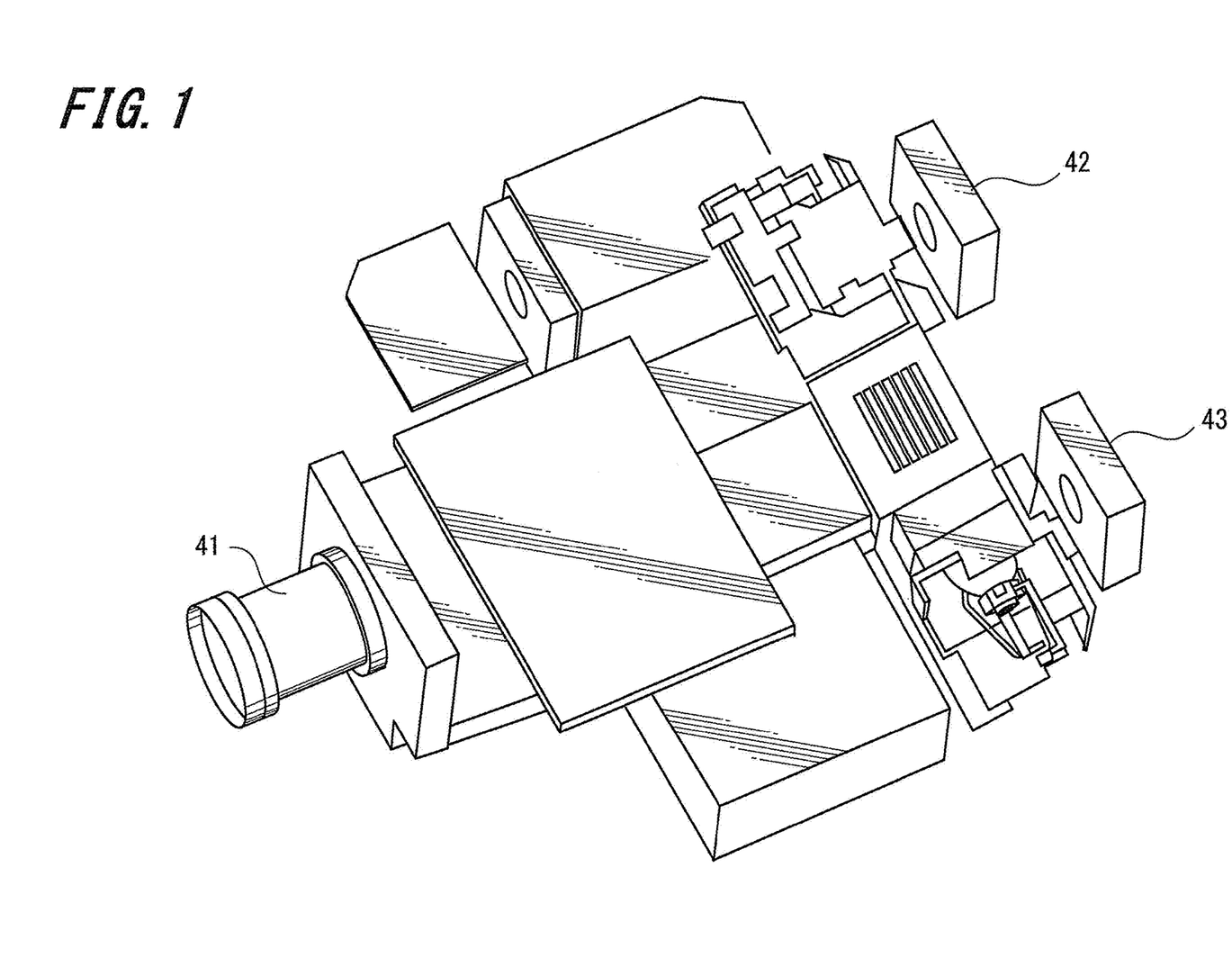
FIG. 1 is a diagram schematically illustrating an appearance of a two-lamp projector according to an embodiment of the present invention.

Hereinafter, a two-lamp projector as an embodiment of the present invention will be described with reference to the attached drawings. FIG. 1 is a diagram schematically illustrating the appearance of the two-lamp projector of the embodiment. The front of the projector (the side where light is projected from a projector lens 41) is on the left side of the figure and the opposite side thereof is provided with cooling fans 42 and 43.

Figure 2:
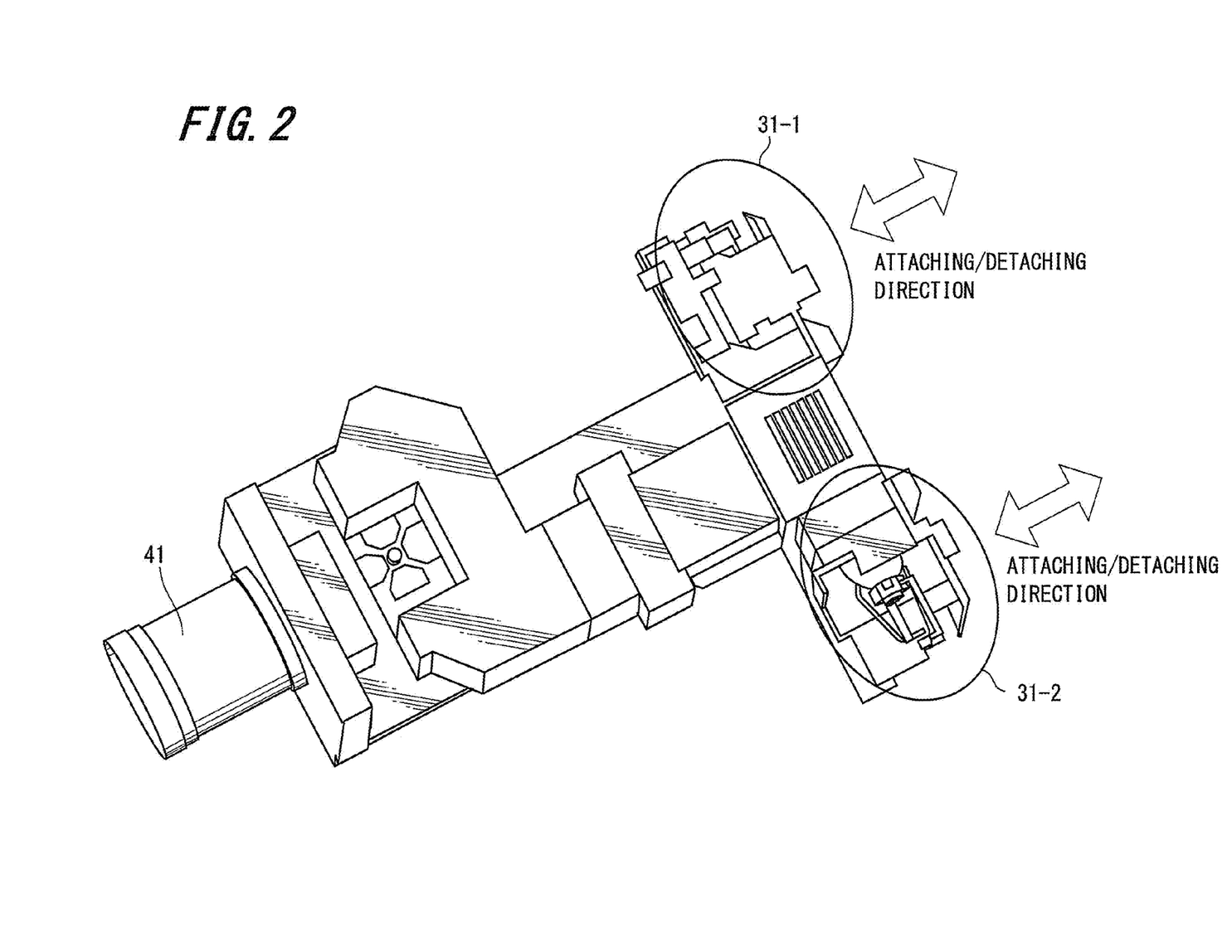
FIG. 2 is a diagram schematically illustrating a housing of an optical system and lamp boxes of the two-lamp projector shown in FIG. 1.

FIG. 2 is a diagram schematically illustrating a housing and lamp boxes of the two-lamp projector. The housing includes an optical system of the projector body therein. As shown in the figure, two lamp boxes 31-1 and 31-2 (encircled portions) can be attached to and detached from the projector body in the directions of arrows. The lamp boxes 31-1 and 31-2 are attached and secured to the body by screws on the opposite sides (on the left and right sides of the projector body viewing from the front thereof) of the housing of the optical-system in the projector body.

The lamp box 31-1 and the lamp box 31-2 may have the same configuration and shape. Thus, the lamp box 31-1 on the left side of the projector body can be interchanged with the lamp box 31-2 on the right side thereof. In other words, they can be attached opposite to their respective positions represented in the figure.

Each of the lamp boxes 31-1 and 31-2 includes a lamp (e.g., a metal halide lamp) as a light source, a reflector for making light emitted from the lamp into parallel beams, and a nonvolatile memory (NVM).

When the lamp boxes 31-1 and 31-2 are attached to the projector body, lamps in the respective boxes are connected to a lamp control circuit in the projector body through connectors on the lamp boxes and the body, respectively. Therefore, with the control from the projector body, the lamps can be switched on/off and kept in any of lamp modes (e.g., two modes: high and low wattages) when switched on.

In the projector body, a light-combining prism combines the parallel light flux from the reflector in the lamp box 31-1 and the parallel light flux from the reflector in the lamp box 31-2 into one parallel light flux and then directs it to an illumination optical system. Subsequently, the illumination optical system divides the parallel light flux into red light rays, green light rays, and blue light rays, followed by allowing the light rays to be incident on liquid crystal panels for displaying red, green, and blue colors, respectively.

Even if one of the lamp boxes 31-1 and 31-2 is only switched on, a parallel light flux from the reflector in the corresponding lamp box can be introduced into the illumination optical system through the same light-combining prism as one used for the light from both the lamp boxes.

Figure 3:
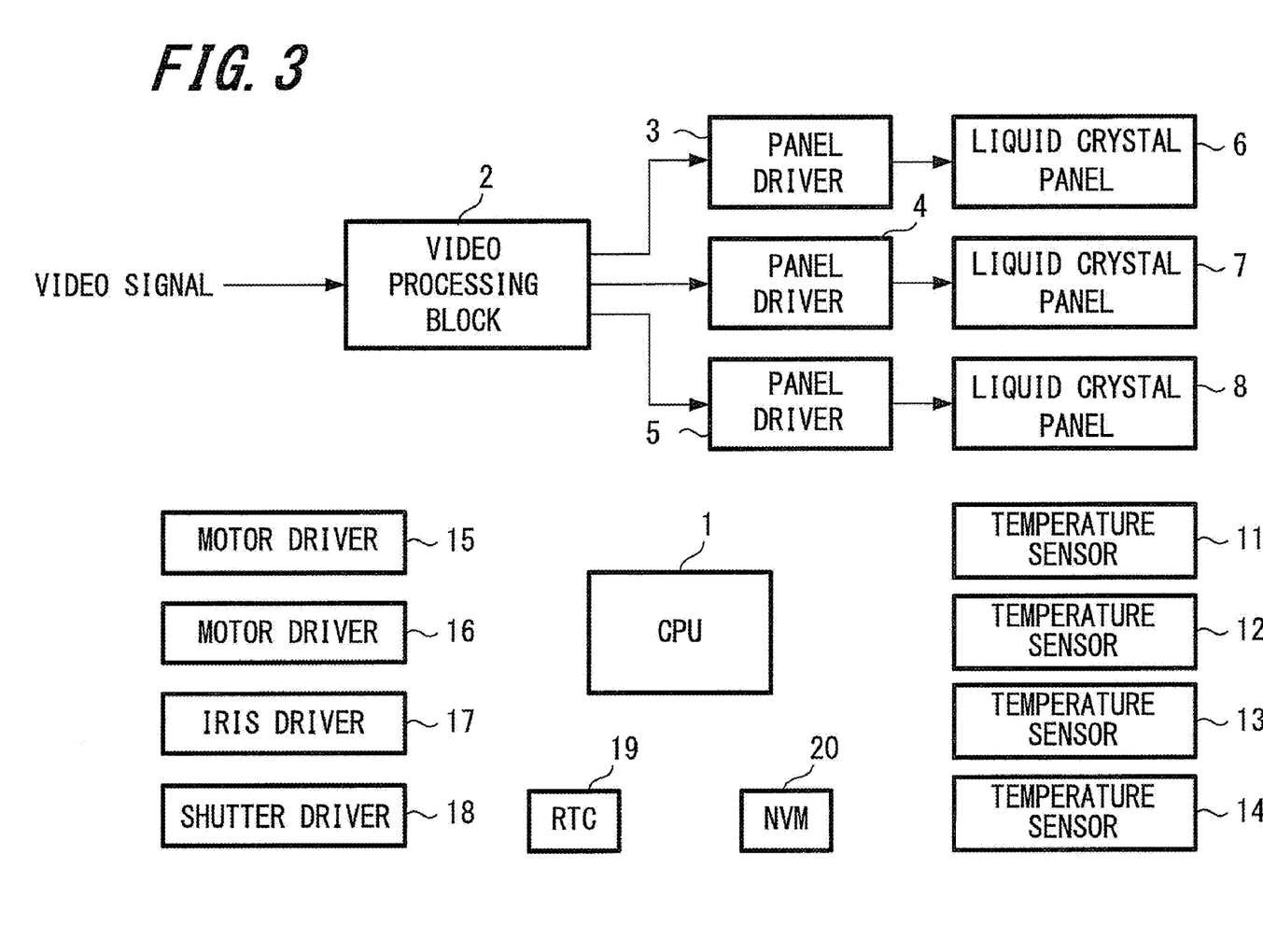
FIG. 3 is a block diagram illustrating a main circuit in a projector body.

FIG. 3 is a block diagram illustrating a main circuit (i.e., circuit functioning in relation to an embodiment of the present invention) in the projector body. The circuit implemented in the projector body include:

a CPU 1 configured to control the entire projector in response to the operation of an operation panel or a remote controller;

a video processing block 2;

panel drivers 3 to 5 configured to drive a red display liquid crystal panel 6, a green display liquid crystal panel 7, and a blue display liquid crystal panel 8, respectively;

lamp control circuits 9 and 10 (not shown in the figure) for two lamp boxes respectively attached to the left and right sides of the projector body;

temperature sensors 11 and 12 configured to detect temperatures of the lamps in two lamp boxes respectively attached to the left and right sides of the projector body;

a temperature sensor 13 configured to detect temperatures of the respective liquid crystal panels 6 to 8;

a temperature sensor 14 configured to detect the external temperature of the projector;

motor drivers 15 and 16 configured to drive the motors of fans 42 and 43 (FIG. 1);

an iris driver 17 configured to adjust an iris in the illumination optical system;

a shutter driver 18 configured to open/close a shutter at the front of the projector lens 41 (FIG. 1);

a real time clock (RTC) 19; and a nonvolatile memory (NVM) 20 configured to store system data.

The video processing block 2 includes an A/D converter, a chroma decoder, a scan converter, and a frame memory. The A/D convertor is provided for converting analog video signals input to the projector body from the outside thereof into digital signals. The chroma decoder is provided for converting composite signals into RGB signals. When using the two-lamp projector by hanging it from the ceiling or using as a rear-projector, the frame memory may be employed to flip a display picture vertically or horizontally by changing the sequence of reading the written image data. RGB signals output from the video processing block 2 are transmitted to the panel drivers 3 to 5, respectively.

Lines connecting the CPU 1 to other circuits may be I2C buses or the like but not shown in FIG. 3.

Figure 4:
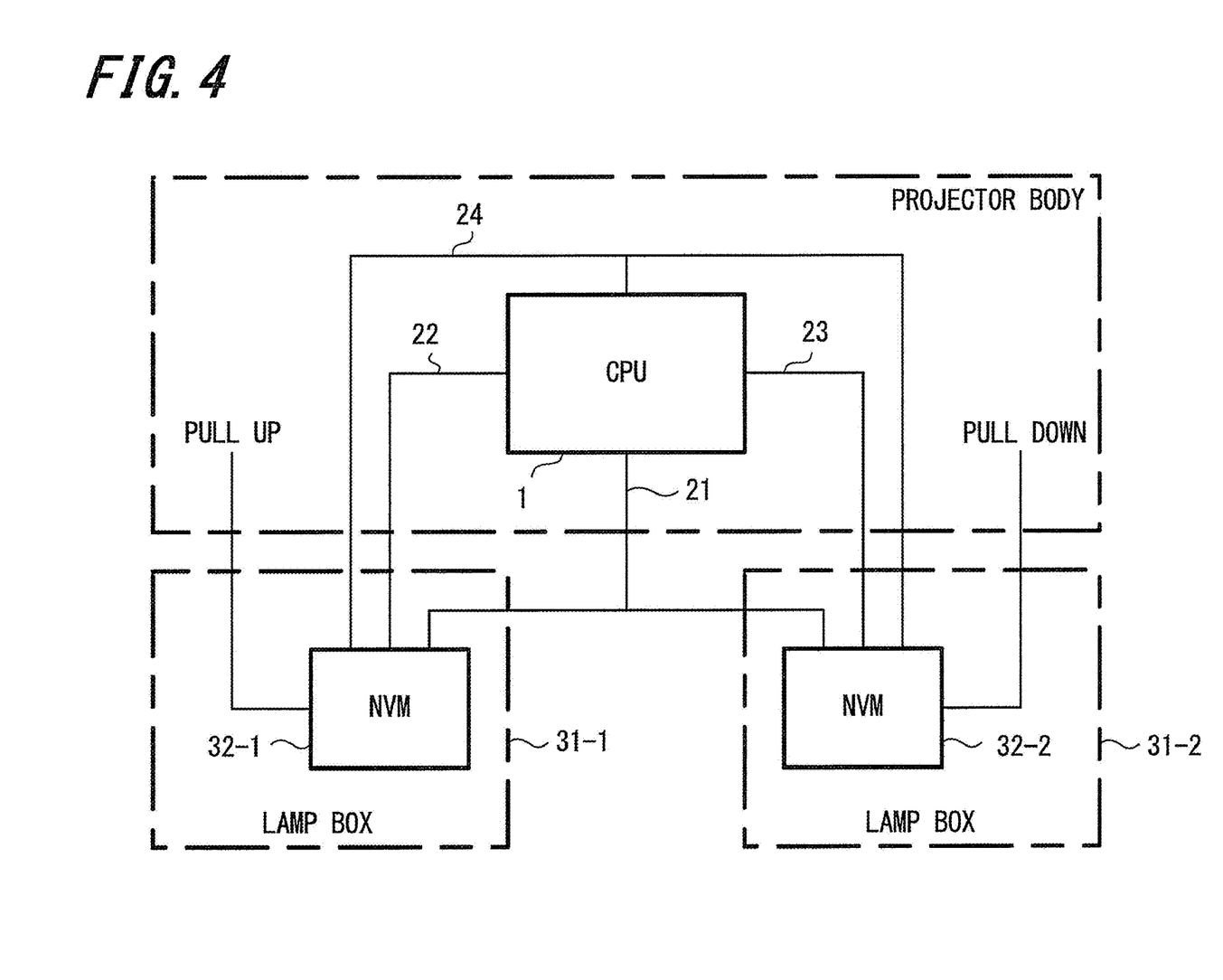
FIG. 4 is a block diagram illustrating a CPU in the projector body and NVMs in the lamp boxes.

FIG. 4 is a block diagram illustrating the CPU 1 in the projector body and the NVMs in the respective lamp boxes 31-1 and 31-2. When the lamp box 31-1 is attached to the left side of the projector body, the NVM 32-1 in the lamp box 31-1 is connected (pulled-up) to a power line of the projector body through a connector on the lamp box and a connecter on the projector body and connected to the CPU 1 through an I2C bus 21, an enable line 22, and a write protect line 24.

When the lamp box 31-2 is attached to the right side of the projector body, the NVM 32-2 in the lamp box 31-2 is connected (pulled-down) to a ground line of the projector body through the connector on the lamp box and a connecter on the projector body and connected to the CPU 1 through an I2C bus 21, an enable line 23, and a write protect line 24.

The enable lines 22 and 23 are provided for allowing the CPU 1 to determine the presence or absence of the lamp boxes individually attached to the left side and the right side of the projector body.

The write protect line 24 is provided for unprotecting the write protect of NVM when carrying out writing on each of the NVMs in the lamp boxes attached to the left and right sides of the projector body.

The CPU 1 assigns the slave address on the I2C bus 21 of the NVM in the attached lamp box depending on whether the NVM is pulled up or pulled down.

As described above, the NVM in the lamp box attached to the left side of the projector body is pulled up, while one on the right side is pulled down. Therefore, the CPU 1 can assign the address of NVM in each attached lamp box with respect to the attaching position of the lamp box.

Figure 5:
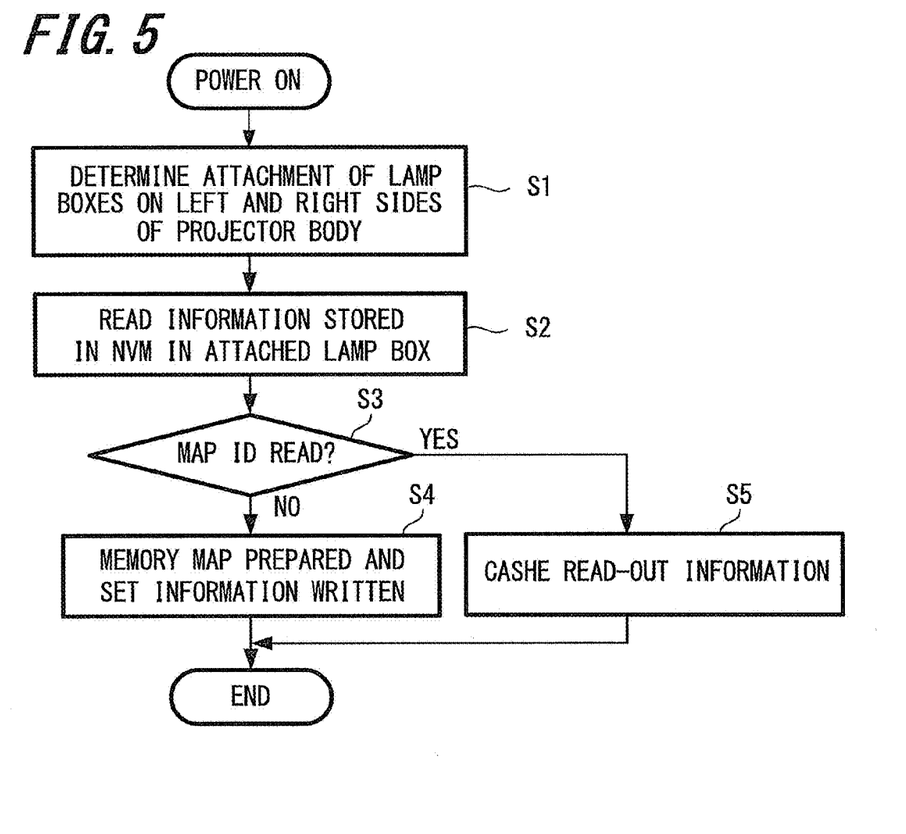
FIG. 5 is a flowchart illustrating processing of initializing NVM, carried out by the CPU.

FIG. 5 is a flowchart illustrating the processing of initializing NVM, carried out by the CPU 1. The processing starts when the AC power source of the projector body is turned on. First, the presence or absence of the lamp boxes on the left and right sides of the projector body is determined using the enable lines 22 and 23 (FIG. 4) (Step S1).

Subsequently, slave addresses are assigned to the NVMs of the attached lamp boxes in accordance with their respective attaching positions in a manner similar to the assignment as described above. The information stored in the NVM in the lamp box is then read out through the I2C bus 21 (Step S2). After that, for determining whether the NVM in the lamp box has been initialized, it is detected whether Map ID described later is read out or not (Step S3).

If it is "No" (if uninitialized), then the lamp box is determined as one being attached for the first time. Thus, a memory map (i.e., a map used for determining a storage area into which later-described "set information" and "protector information" are written) is prepared and the set information is then written into the storage area (Step S4). Consequently, the processing is ended.

If it is "Yes" in Step S3 (if initialized), then each piece of read-out information is cashed in the memory in the CPU (the cashed information may be used, for example, in the operation of displaying the information about an operating time or the like on screen) (Step S5). Consequently, the processing is ended.

The contents of the set information written into the NVM in the lamp box by the CPU 1 include the following (1) to (17):

(1) The signature of the manufacturer producing the two-lamp projector;

(2) The version of the memory map being used (it will be upgraded when the structure of the memory map is modified, and the version and the signature of the above item (1) constitute the above Map ID.);

(3) The model name of the projector being used;

(4) The serial number of the projector being used;

(5) The number of lighting (including the number of retrying);

(6) The number of hours for which the lamp has been lit at "Low" (hours in the duration time);

(7) The number of minutes for which the lamp has been lit at "Low" (minutes in the duration time);

(8) The number of hours for which the lamp has been lit at "High";

(9) The number of minutes for which the lamp has been lit at "High";

(10) The lamp-box number (lamp No.) corresponding to the position to which the lamp-box is attached ("1 (one)" is the lamp No. of the lamp box attached on the left side of the projector body and "2 (two)" is the lamp No. of one on the right side.

(11) The serial ID number of the attached lamp box (Lamp ID);

(12) The date of the first lighting of the lamp;

(13) The time distribution of the number of lighting;

(14) The setting conditions of a picture inversion mode (mode for vertical or horizontal inversion of a displayed picture);

(15) The setting conditions of a high-altitude mode (mode for setting the numbers of rotations of fans 42 and 43 (FIG. 1) to "High" at high altitudes with low atmospheric pressures);

(16) The time distribution of lamp-mode switching; and (17) The number of retrying the lightning of the lamp.

After writing such set information into the NVM by NVM-initialization processing as represented in FIG. 5, the CPU 1 updates the set information in the NVM by writing the latest set information into the NVM. In other words, the writing of the latest set information is carried out when the lamp is lit, when the lamp boxes are interchanged (e.g., the lamp box 31-1 at the left attaching position is interchanged with the lamp box 31-2 at the right attaching position), or when the setting of any mode (lamp mode, picture inversion mode, high altitude mode, or the like) is changed. Alternatively, the writing of the latest set information is carried out every time a predetermined time (e.g., 15 minutes) passes.

Furthermore, the CPU 1 continuously reads the lamp No. from the set information. Thus, the CPU 1 determines the interchange of the lamp boxes by detecting whether the lamp No. is changed from 1 to 2 or vice versa.

Furthermore, if any failure or error occurs in the projector body, then the CPU 1 writes the following items (21) to (35) as information representing the setting conditions and usage environment of the projector upon the occurrence of failure or error into the NVM in each lamp box being attached:

(21) The newest number of protector information (value incremented by one per writing of the protector information (i.e., 0, 1, 2, . . . ));

(22) A power mode upon the occurrence of failure or error (mode for setting an inner power state of software to standby, lamp-on, power-on, power-saving, or the like);

(23) The lamp No. upon the occurrence of failure or error;

(24) The temperature of the lamp in the lamp box attached to the left side of the projector body upon the occurrence of failure or error;

(25) The temperature of the lamp in the lamp box attached to the right side of the projector body upon the occurrence of failure or error;

(26) The temperatures of the liquid crystal panels 6 to 8 (FIG. 3) upon the occurrence of failure or error;

(27) The number of hours for which the lamps of the respective lamp boxes attached to the projector body are lit upon the occurrence of failure or error (hours in the duration time);

(28) The number of minutes for which the lamps of the respective lamp boxes attached to the projector body are lit upon the occurrence of failure or error (minutes in the duration time);

(29) A lamp lighting mode upon the occurrence of failure or error (mode for setting a lighting pattern to a two-lamp pattern in which both the two lamps are turned on; an automatic one-lamp pattern in which only one lamp with a longer remaining life time is turned on; and a forced one-lamp pattern in which only one lamp selected using an operation panel or a remote controller is turned on);

(30) A lamp mode upon the occurrence of failure or error;

(31) A high-altitude mode upon the occurrence of failure or error;

(32) A picture inversion mode upon the occurrence of failure or error;

(33) An open/close state of a shutter upon the occurrence of failure or error;

(34) An iris-adjusted state upon the occurrence of failure or error; and (35) Whether the number of rotations of each fan has been smoothly increased (in the state of smoothly increasing the numbers of rotations of the respective fans 42 and 43 (FIG. 1) to reduce noise when the number of the rotations of each fan is switched from "Low" to "High") upon the occurrence of failure or error.

The two-lamp projector constructed as described above may have various effects as described in the following items (A) to (D).

(A) At the time of replacing a lamp, the corresponding NVM storing the information about the operating time of the lamp (the information items (6) to (9) among the items of the set information) is also replaced and therefore the reset operation at the replacement can be omitted.

In many cases, only one of two lamps in the two-lamp projector may be replaced with a newly prepared lamp. In such cases, there may be a need of remembering which lamp is replaced when carrying out reset operation in the related art before resetting the operating time of the lamp. Thus, the reset operation may be more complicated, leading to an increase in possibility of wrong operation (e.g., the reset operation is carried out on the operating time of a lamp not replaced). Therefore, it is advantageous that the reset operation may not be required.

(B) The slave addresses of the NVMs 32-1 and 32-2 in the respective lamp boxes 31-1 and 31-2 are assigned on the I2C bus 21 (FIG. 4) according to the attaching positions of the lamp boxes. In other words, the slave addresses of the respective NVMs 32-1 and 32-2 are not fixed addresses and can be interchanged with each other after interchanging the lamp boxes 31-1 and 31-2 at the respective attaching positions. In contrast, when focusing attention on the individual attaching positions, the slave addresses of NVMs in the respective lamp boxes attached are fixed addresses. Thus, the slave addresses thus determined are designated to write information (e.g., set information and protector information) into the respective NVMs 32-1 and 32-2.

Here, if the NVMs 32-1 and 32-2 have their respective fixed slave addresses, after interchanging the lamp boxes 31-1 and 31-2 at the respective attaching positions, the slave address of NVM at an attaching position is different from that of the previous NVM at the same attaching position. Therefore, when the user intends to write the information about the operating time of a lamp into the NVM in the lamp box including the lamp, it is difficult to access the NVM and write information into such a NVM without an error. In other words, for example, when the user intends to write the information about the operating time of a lamp into a NVM in a lamp box at the left-side attaching position, the information may be written into a NVM in a lamp box at the right-side attaching position. This may occur because the address assigned on the NVM in the previous lamp box, which is currently located on another attaching position due to the interchange, may be designated.

According to the embodiment of the present invention, on the other hand, the slave addresses of the NVMs at the respective attaching positions are individually fixed. Thus, when the operating time or the like of a lamp is written into the NVM, the fixed address corresponding to the attaching position of the lamp may be assigned. In this case, regardless of the interchange of the lamp boxes, the NVM in the lamp box including the lamp can be accessed and the information can be then written into such NVM without an error.

Consequently, the operating times or the like of the respective lamps can be managed without an error even if any lamp is replaced with a newly prepared lamp or lamps at respective attaching positions are interchanged with each other.

(C) If the interchange of lamps prevents the using time of each lamp or the like from being managed without an error, in order to physically make the interchange impossible, it may be required to use different lamp assemblies for the lamp boxes attached to the left and right sides of the projector body. In other words, for example, the configuration and shape of the lamp box 31-1 may be different from those of the lamp box 31-2 so that the lamp box 31-1 can only be attached to the left side of the projector body while the lamp box 31-2 can only be attached to the right side thereof.

According to the embodiment of the present invention, on the other hand, even if the interchange of lamps occurs just as in the case with the above (B), the using time or the like of each lamp can be managed without an error. Thus, preparing for the interchange, the lamp assemblies for the lamp boxes attached to the left and right sides of the projector body can be standardized (the configuration and the shape of the lamp box 31-1 can be identical with those of the lamp box 31-2 as described above). Consequently, the production costs of the lamp boxes used in the two-lamp projector can be reduced.

(D) When the lamp box is collected from the market to a manufacturing facility because of a broken or damaged lamp, the set information or protector information stored in the NVM in such a lamp box may be checked to estimate the conditions of the projector at the time of failure or breakage. Thus, after-sale service and maintenance can be improved.

For checking the information stored in the NVM in the lamp box collected as described above, it is complicated to mount the lamp box on the projector body and display the information on a screen.

Figure 6:
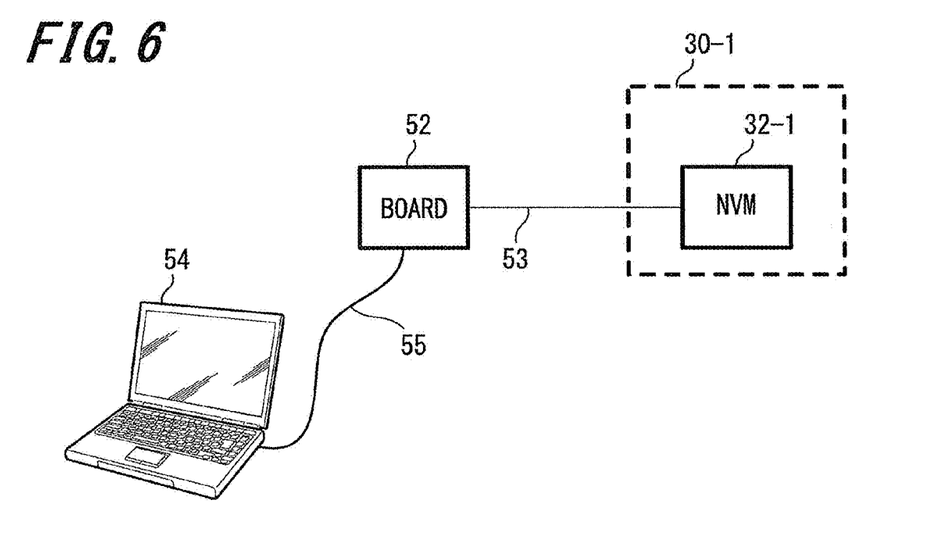
FIG. 6 is a diagram illustrating an example of a method for reading the information stored in the NVM in a collected lamp box.

According to the embodiment of the present invention, for example, the NVM 32-1 in the collected lamp box (here, the lamp box 31-1) is connected to a board 52 via an I2C bus 53 as shown in FIG. 6. Here, the board 52 includes a conversion circuit 51 carrying out protocol conversion between the protocol of the I2C bus 53 and the protocol of RS-232C cable 55. The board 52 is connected to a personal computer 54 via a RS-232C cable 55. The personal computer 54 may read the information stored in the NVM 32-1 via the conversion circuit and then display the information on the screen.

In the above description, the two-light projector has been described as the embodiment of the present invention. Alternatively, the present invention may be applied to a multi-lamp projector with three or more lamps.

It should be understood by those skilled in the art that various modifications, combinations, sub-combinations and alterations may occur depending on design requirements and other factors insofar as they are within the scope of the appended claims or the equivalents thereof.

What is claimed is:

1. A multi-lamp projection display apparatus, comprising:
a plurality of detachable lamp boxes each including a lamp used as a light source and a memory, wherein each of the plurality of lamps boxes produces a parallel light flux, and wherein the memory in each of the lamp boxes attached is connected as a slave device to a common bus;
a light-combining prism to combine each of the plurality of parallel light fluxes into a combined parallel light flux; and
control means for:
assigning an address of the memory in each of the plurality of lamp boxes in accordance with an attaching position of the lamp box;
determining if a first lamp box of the plurality of lamp boxes has been initialized;
if the first lamp box is determined to not be initialized, preparing a memory map and writing information into the memory; and
if the first lamp box is determined to be initialized, reading out information stored in the memory.

2. The multi-lamp projection display apparatus according to claim 1, wherein the control means is configured to write information about an operating time of the lamp in the lamp box into the memory included therein.

3. The multi-lamp projection display apparatus according to claim 2, wherein the information about the operating time of the lamp in the lamp box comprises information about an amount of time the lamp spent lit at high and information about an amount of time the lamp spent lit at low.

4. The multi-lamp projection display apparatus according to claim 1, wherein the control means is configured to write information about an operating environment into the memory when any failure occurs in the multi-lamp projection display apparatus.

5. The multi-lamp projection display apparatus according to claim 4, wherein the information about an operating environment comprises the temperature of the lamp in the first lamp box.

6. The multi-lamp projection display apparatus according to claim 4, wherein the information about an operating environment comprises a lamp lighting mode.

7. The multi-lamp projection display apparatus according to claim 4, wherein the information about an operating environment comprises a power mode.

8. The multi-lamp projection display apparatus according to claim 4, wherein the information about an operating environment comprises information about a fan of the multi-lamp projection display apparatus.

9. The multi-lamp projection display apparatus according to claim 1, wherein the control means is configured to write different lamp-box numbers into the memories mounted on the respective lamp boxes attached and determine whether the lamp boxes at attaching positions are interchanged with each other by reading the lamp-box numbers.

10. The multi-lamp projection display apparatus according to claim 1, wherein the control means is configured to write information about a date of first lighting of the lamp box.

11. A multi-lamp projection display apparatus, comprising:
a plurality of detachable lamp boxes each including a lamp used as a light source and a memory, wherein each of the plurality of lamps boxes produces a parallel light flux, and wherein the memory in each of the lamp boxes attached is connected as a slave device to a common bus;
a light-combining prism to combine each of the plurality of parallel light fluxes into a combined parallel light flux; and
a control device configured to:
assign an address of the memory in each of the plurality of lamp boxes in accordance with an attaching position of the lamp box;
determine if a first lamp box of the plurality of lamp boxes has been initialized;
if the first lamp box is determined to not be initialized, prepare a memory map and write information into the memory; and
if the first lamp box is determined to be initialized, read out information stored in the memory.

* * * * *